(12) United States Patent
Carlson

(10) Patent No.: US 6,560,664 B1
(45) Date of Patent: May 6, 2003

(54) METHOD AND APPARATUS FOR TRANSLATION LOOKASIDE BUFFERS TO ACCESS A COMMON HARDWARE PAGE WALKER

(75) Inventor: Richard Carlson, Ft Collins, CO (US)

(73) Assignee: Hewlett Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/507,037

(22) Filed: Feb. 18, 2000

(51) Int. Cl.[7] .............................................. G06F 13/36
(52) U.S. Cl. ...................................... 710/113; 711/147
(58) Field of Search ........................... 710/113; 711/206, 711/147; 712/25

(56) References Cited

U.S. PATENT DOCUMENTS

| | | | |
|---|---|---|---|
| 5,560,029 A | * | 9/1996 | Papadopoulos et al. ........ 712/25 |
| 5,729,714 A | * | 3/1998 | Dei ............................. 711/147 |
| 5,835,962 A | * | 11/1998 | Chang et al. ................ 711/206 |
| 5,859,999 A | | 1/1999 | Morris et al. ................ 395/565 |
| 5,860,017 A | | 1/1999 | Sharangpani et al. .. 395/800.23 |
| 5,893,931 A | * | 4/1999 | Peng et al. .................. 711/206 |
| 5,906,001 A | | 5/1999 | Wu et al. ..................... 711/154 |
| 5,960,463 A | * | 9/1999 | Sharma et al. .............. 711/206 |
| 6,016,528 A | | 1/2000 | Jaramillo et al. ........... 710/243 |
| 6,035,361 A | | 3/2000 | Kim et al. ................... 710/113 |
| 6,101,570 A | | 8/2000 | Neumyer ..................... 710/240 |
| 6,253,269 B1 | | 6/2001 | Cranston et al. ............ 710/107 |

OTHER PUBLICATIONS

Wolfe, A., "Patients shed light on Merced's", Electronic Engineering Times, Feb. 15, 1999.

* cited by examiner

*Primary Examiner*—Mark H. Rinehart
*Assistant Examiner*—David Glass

(57) ABSTRACT

A common hardware page walker includes an arbitration logic block that controls data bus access between the arbitration logic block and multiple translation lookaside buffers (TLBs), such as an instruction TLB and a data TLB. The arbitration logic block simplifies the complexity within the hardware page walker and makes multiple-state data transfer possible. Each unit (i.e., the hardware page walker and a data TLB and an instruction TLB) has a unidirectional bus that it always drives, and the arbitration logic block informs the hardware page walker which of the busses is active during any given cycle. Thus, the hardware page walker can receive only one command per cycle, and needs no extra logic to handle multiple bus access requests.

20 Claims, 2 Drawing Sheets

METHOD AND APPARATUS FOR TRANSLATION LOOKASIDE BUFFERS TO ACCESS A COMMON HARDWARE PAGE WALKER

TECHNICAL FIELD

The technical field is computer microarchitectures using translation lookaside buffers.

BACKGROUND

In modern computer memory architectures, a central processing unit (CPU) produces virtual addresses that are translated by a combination of hardware and software to physical addresses. The physical addresses are used to access a main memory. A group of virtual addresses may be dynamically assigned to a page. Virtual memory requires a data structure, sometimes called a page table, that translates the virtual address to the physical address. To reduce address translation time, computers may use a specialized associative cache dedicated to address location, called a translation lookaside buffer (TLB).

In some instances, a desired address translation (virtual-to-physical address mapping) entry may be missing from the TLB. The computer system could then generate a fault, invoke the operating system, and install the desired TLB entry using software.

Alternatively, a hardware page walker in the CPU may be used to install a missing TLB entry for a memory reference. If the TLB does not contain a virtual-to-physical address mapping that applies to a memory reference, the hardware page walker is invoked to find the desired mapping in a page table stored in main memory. The new mapping (if found) is installed in the TLB. Then, the original memory reference re-accesses the TLB and uses the newly-installed mapping to generate the appropriate physical address. The hardware page walker has the advantage of generally being faster than generating a fault and installing a new mapping using operating system software.

Challenges in the design of a hardware page walker include bus arbitration and wiring complexity, especially when multiple TLBs (e.g., an instruction TLB and a data TLB) must access the hardware page walker. Since each of the multiple TLBs can operate independently, requests from each of the TLBs may occur close to or simultaneous with other requests or with responses from the hardware page walker. In addition, virtual address requests from each TLB to the hardware page walker, and virtual and physical addresses together with permissions and attributes from the hardware page walker back to each TLB, can total hundreds of signals.

One existing solution connects two TLBs and the hardware page walker using one long, bidirectional bus, with a central arbiter to prevent bus contention. Each of the TLBs and the hardware page walker can both drive data onto and receive data from the bidirectional bus. However, the bidirectional bus is up to twice as long as separate busses from the hardware page walker to each TLB would need to be. And, since the bus is bidirectional, large drivers are required with each unit (i.e., with each TLB and the hardware page walker). This arrangement may also require large and complex bidirectional repeaters between units, and may lead to a large capacitance due to the large drivers and repeaters. As a result, this arrangement may be unacceptably slow.

Another current solution connects the hardware page walker to both TLBs using separate unidirectional busses, but does not include the central arbiter. In this solution, each unit is allowed to drive information onto its outgoing data bus at any time. However, since the hardware page walker can receive information from both TLBs simultaneously, the complexity and circuitry needed to receive and handle the information is increased.

SUMMARY

To overcome limitations inherent in existing solutions, an arbitration logic block (or arbiter) is provided. The arbiter simplifies the complexity within the hardware page walker and makes multiple-state data transfer easy to implement. Each unit (i.e., the hardware page walker and a data TLB and an instruction TLB) has a unidirectional bus that the unit always drives, and the arbiter informs the hardware page walker (and the driving units) which of the busses has been selected to be enabled during any given clock cycle. Thus, the hardware page walker can receive only one command per clock cycle, and needs no extra logic to handle multiple requests at a time. The arbiter also simplifies the TLBs, because a TLB will never receive an incoming bus command at the same time as it is driving an outgoing bus command.

The arbiter also supports transfers that require multiple clock cycles to complete. If a unit that requires a multiple-cycle transfer is selected for bus ownership, that unit is guaranteed to have its bus grant maintained for enough consecutive clock cycles to complete a data transfer. The arbiter can also support different numbers of transfer cycles for each unit. This allows each unit to have a very simple bus interface. The unit requests the bus and begins driving the first cycle of data for its transfer. The unit continues to drive the first cycle of data, if necessary, until the unit receives a bus grant. The unit then proceeds to drive successive cycles of data.

DESCRIPTION OF THE DRAWINGS

The detailed description will refer to the following drawings in which like numerals refer to like items, and wherein.

DETAILED DESCRIPTION

Figure 1:
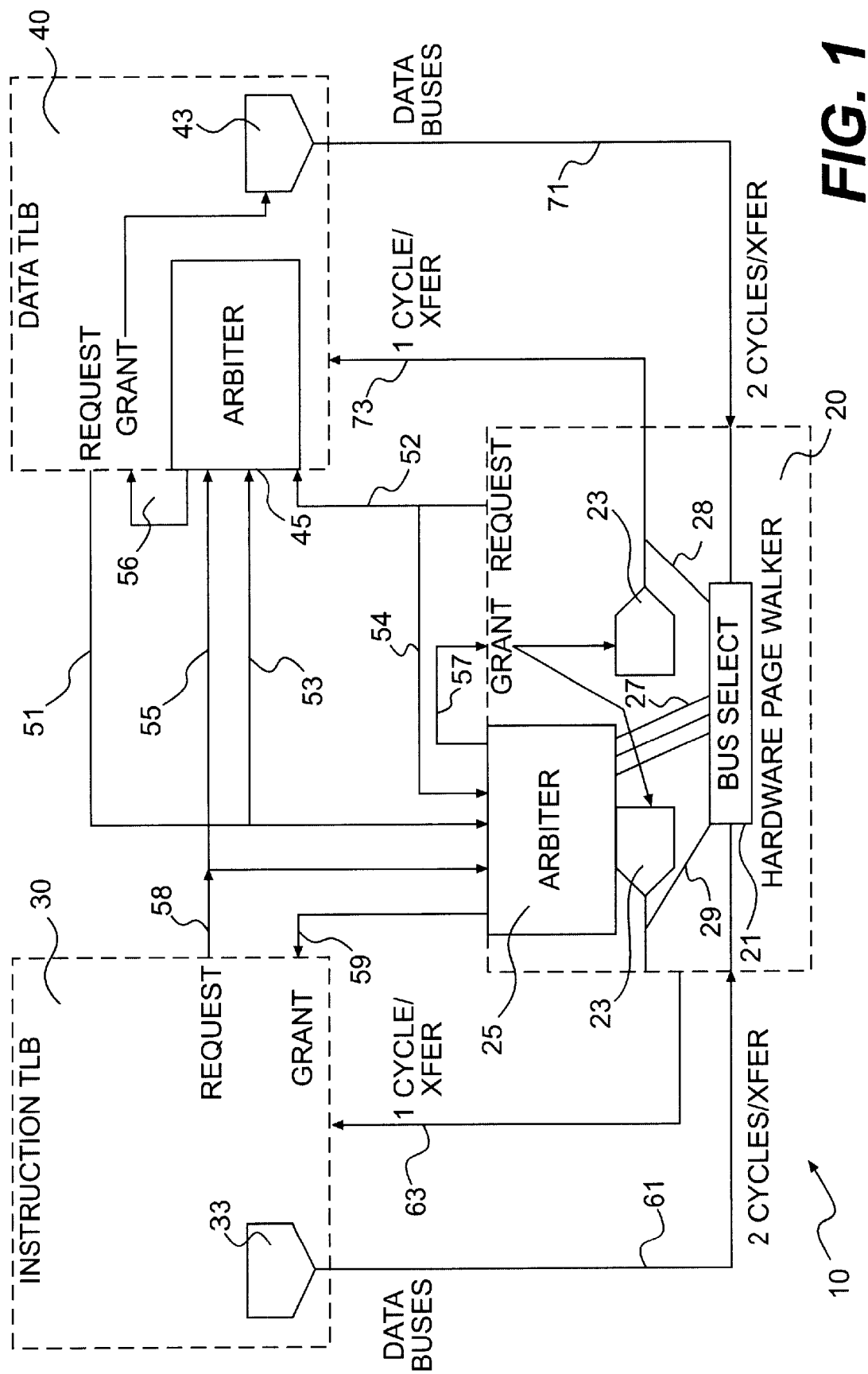
FIG. 1 is a diagram of a mechanism that allows multiple TLBs to access a common hardware page walker.

FIG. 1 shows a mechanism 10 that allows multiple TLBs to access a common hardware page walker. A data TLB 40 and an instruction TLB 30 connect to a hardware page walker 20 using data busses 61, 63, 71 and 73. The structure of the data busses 61, 63, 71 and 73 will be described later. The data TLB 40 and the instruction TLB 30 also connect to the hardware page walker 20 using bus access request and bus grant lines 51–59. Signaling using the bus access request and bus grant lines 51–59 will be described later.

The hardware page walker 20 includes an arbiter 25. The arbiter 25 receives requests and issues grants using a bus arbitration scheme that will be described later.

A bus select unit 21 is coupled to the arbiter 25 by signal lines 27. The bus select unit 21 is also coupled to the data busses 71 and 61. Three signal lines 27 may be used, one for each of the three units (i.e., one for each of the hardware page walker 20, the instruction TLB 30 and the data TLB 40) to signal which unit is driving data. The bus select unit 21 is used by the hardware page walker 20 to determine which of the data busses 61, 63, 71 or 73 is currently being used to transfer data. The bus select unit 21 feeds data to the hardware page walker 20 from any of its multiple sources. That is, for operating on incoming data, the hardware page walker 20 may receive data from either the instruction TLB 30 or the data TLB 40 or the hardware page walker 20 itself during a particular clock cycle. Outgoing data may be sent from the hardware page walker 20 to the instruction TLB 30 and/or the data TLB 40. To receive incoming data, the hardware page walker 20 needs information from the arbiter 25 to indicate which unit is driving a data bus. The instruction TLB 30 and the data TLB 40 only receive data from one bus and drive data out on one bus, and therefore do not require a similar bus select unit.

The bus select unit 21 is used by the hardware page walker 20 to receive data from the instruction TLB 30 and the data TLB 40. In an embodiment, the bus select unit 21 may incorporate a multiplexer (not shown) to select the data from the instruction TLB 30 and the data TLB 40 before the data is used by the hardware page walker 20.

Bus driver enablers 23 are coupled to the arbiter 25. The bus driver enablers 23 receive bus grant signals from the arbiter 25. The bus driver enablers 23 are used to drive data onto the data busses 63 and 73. That is, if the hardware page walker 20 receives a bus grant, then both bus driver enablers 23 operate to drive data on to the data busses 63 and 73. When the hardware page walker 20 does not receive a bus grant, the bus driver enablers 23 ensure that a valid command is blocked from being sent onto the data busses 63 and 73. In an embodiment, the hardware page walker 20 blocks all bits of data to save power; alternatively, the hardware page walker 20 might block only the control bit or bits that flag a valid transfer. In some cases, both the instruction TLB 30 and the data TLB 40 receive data during the same clock cycle. In other cases, only one of the instruction TLB 30 and the data TLB 40 receive data during a clock cycle. Data intended only for the instruction TLB 30 is ignored by the data TLB 40. Similarly, data intended only for the data TLB 40 is ignored by the instruction TLB 30. The data driven by the bus driver enablers 23 is sent from the bus select unit 21 to data output paths 28 and 29 and then to the data busses 63 and 73, respectively.

The instruction TLB 30, which may be physically located close to the hardware page walker 20, includes a driver 33 to drive data onto the data bus 61. The instruction TLB 30 receives data from the hardware page walker 20 over the data bus 63. Finally, the instruction TLB 30 sends bus requests over the signal line 58 and receives bus grants the signal line 59. In an embodiment, the instruction TLB 30 might also be far from the hardware page walker 20 and need a local arbiter similar to that described for the data TLB 40.

The data TLB 40 includes an arbiter 45 that is similar in all respects to the arbiter 25 except that the arbiter 45 need generate only the data TLB 40 grant. The arbiter 45 is included in the data TLB 40 because in an embodiment, the data TLB 40 may be physically located far from the hardware page walker 20. Because of the relative large distance between the hardware page walker 20 and the data TLB 40, signals sent from one unit to the other, and returned, may not be complete the round trip in one clock cycle. For example, if the data TLB 40 were to send a bus access request to the hardware page walker 20, the transit time for this request, and a subsequent bus grant may exceed one clock cycle. By placing the arbiter 45 in the data TLB 40, the longest signal path is from the hardware page walker 20, or the instruction TLB 30, to the data TLB 40, which can be completed in one clock cycle. Thus, in all situations, a bus access request may be signaled, and a corresponding bus grant signal may be sent, within one clock cycle.

As an alternative to using the arbiter 45, the data TLB 40 could be located close enough to the hardware page walker 20 so that the bus request/bus grant signaling is completed in one clock cycle. However, layout of these units may be driven by factors other than optimizing the bus request/bus grant signaling.

The data TLB 40 also includes a bus driver enabler 43 that is used to drive data onto the data bus 71. Finally, the data TLB 40 includes connections to signal lines to send and receive bus requests and bus grants.

As shown in FIG. 1, the data bus 63 and the data bus 73 may be 64 bits wide in order to ensure fast operation. That is, the data busses coming out of the hardware page walker 20 are used very often and should enable data transfer in one clock cycle. Data transferred into the TLBs may include a desired physical address, or protection information, for example. Data (e.g., a virtual address being requested) into the hardware page walker 20 may be provided at a lower rate, such as two cycles per transfer, and hence the data buses 61 and 71 may be 32 bits wide, for example.

A bus access request from the hardware page walker 20 is signaled to the arbiter 45 over signal line 52 and is signaled to the arbiter 25 over signal line 54. Both arbiters 25 and 45 receive the same bus access requests and calculate the bus grants using the same algorithm to ensure no conflicts exist in the bus arbitration. The instruction TLB 30 signals a bus access request to the arbiter 25 over the signal line 58. The same signal is further routed to the arbiter 45 over the signal line 55. Finally, the data TLB 40 signals a bus access request to the arbiter 25 over the signal line 51. The same bus access request is signaled to the arbiter 45 over the signal line 53.

A bus grant signal is signaled to the hardware page walker 20 from the arbiter 25 using the signal line 57. The bus grant signal is applied to each of the bus driver enablers 23, which then drive data to the instruction TLB 30 and the data TLB 40. The data itself indicates whether the instruction TLB 30, the data TLB 40, or both should act on that command. Thus, the arbiter 45 and bus driver enablers 23 do not need to distinguish between the various types of hardware page walker commands. A bus grant signal is signaled from the arbiter 25 to the instruction TLB 30 using the signal line 59. The bus grant signal is applied to the bus driver enabler 33, which then drives data (e.g., a physical address) to the hardware page walker 20 using the data bus 61. A bus grant signal is signaled from the arbiter 45 to the data TLB 40 using the signal line 56. The bus grant signal is applied to the bus driver enabler 43, which then drives data to the hardware page walker 20 using the data bus 71.

The bus grant signals noted above are also signaled to the bus select unit 21, using the signal paths 27. The bus select signal 21 uses the bus grant signals to determine which of the data busses 61 and 71 to use as an input source during each clock cycle. For example, if the data TLB 40 wins the bus arbitration, the bus select unit 21 will receive a bus grant signal over the appropriate signal line 27 indicating to the bus select unit 21 that the input bus will be the data bus 71.

The arbiter 25 uses any of various algorithms to arbitrate bus access. The arbiter 25 serves to serialize operations on the busses 61, 63, 71 and 73 to ensure than only one data transfer occurs at a time. In an embodiment, the arbiter 25 uses a fixed priority scheme, in which the hardware page walker 25 has highest priority, followed by the instruction TLB 30, followed, in turn, by the data TLB 40. However, the arbiter 25 is not limited to use of this fixed priority algorithm, and any industry-standard algorithm may be used. Such algorithms include a round-robin or time slice scheme to ensure fairness, or a dynamic priority encoding scheme to optimize latency for changing workloads. Whatever algorithm is implemented in the arbiter 25 is also implemented in the arbiter 45.

Figure 2:
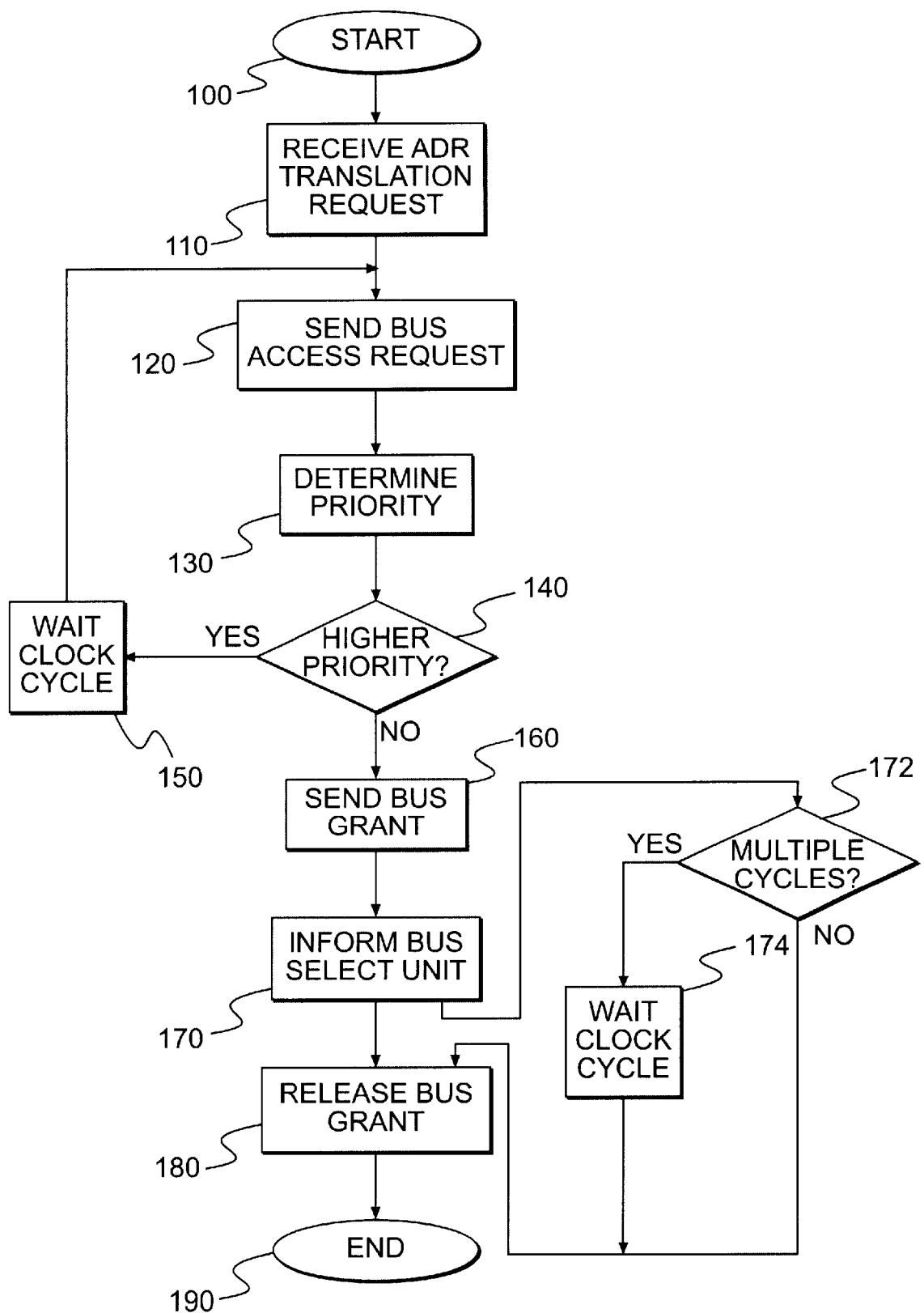
FIG. 2 is a flow diagram illustrating an operation of the mechanism shown in FIG. 1.

An example of the operation of the mechanism 10 shown in FIG. 1 will now be explained with reference to the flowchart shown in FIG. 2. In this example, the data TLB 40 has been accessed and must provide a physical address corresponding to a virtual address. However, the physical address information is not located in the data TLB 40. The process starts with step 100. The data TLB 40 receives an address translation request and determines that the physical address is not held by the data TLB 40, block 110. The data TLB 40 then sends a bus access request to the arbiter 25 in the hardware page walker 20 and to the arbiter 45, block 120. The arbiters 25 and 45, using the same arbitration algorithm, determine priority, block 130 and determine if any higher priority bus access requests have been received during the same clock cycle, block 140. If a higher priority bus access request has been received during the same clock cycle, or a data bus is being used for multiple clock cycles, the bus access request from the data TLB 40 is not granted, and the data TLB 40 waits until the next clock cycle to resend the bus access request, block 150. If no higher bus access request has been received during the same clock cycle, and if a data bus is not being used for multiple clock cycles, the arbiter 45 sends a bus grant signal to the bus driver enabler 43 in the data TLB 40, block 160. The arbiter 25 sends a signal to the bus select unit 21 indicating that the data bus 71 will be used to receive data, block 170. The data transferred from the data TLB 40 may require two clock cycles to complete. In block 172, the arbiters 25 and 45 determine if multiple cycles are required. If multiple cycles are required, the arbiters 25 and 45 wait the additional cycles, block 174. After the data transfer is complete, the bus grant is released, block 180. The process then ends, block 190.

The terms and descriptions used herein are set forth by way of illustration only and are not meant as limitations. Those skilled in the art will recognize that many variations are possible within the spirit and scope of the invention as defined in the following claims, and equivalents, in which all terms are to be understood in their broadest possible sense unless otherwise indicated.

What is claimed is:

1. A mechanism for allowing multiple translation lookaside buffers (TLBs) to access a common hardware page walker, comprising:
    a first arbiter comprising an arbitration logic, the first arbiter determining a priority between one of the multiple TLBs and the hardware page walker;
    a bus select unit coupled to the first arbiter; and
    one or more data busses coupled to the bus select unit.

2. The mechanism of claim 1, further comprising a second arbiter located in a TLB, the second arbiter comprising the arbitration logic.

3. The mechanism of claim 2, wherein the TLB is a data TLB, and wherein one of the multiple TLBs is an instruction TLB.

4. The mechanism of claim 3, wherein the hardware page walker drives data to the data TLB and the instruction TLB in one clock cycle and receives data from the data TLB and the instruction TLB in two clock cycles.

5. The mechanism of claim 1, wherein the first arbiter signals the bus select unit which of the one or more busses is used to transfer data during each particular cycle.

6. The mechanism of claim 1, wherein the arbitration logic is a fixed priority logic.

7. The mechanism of claim 1, wherein the arbitration logic includes one of a round-robin and a time slice priority scheme, wherein the round robin and the time slice priority schemes ensure fairness.

8. The mechanism of claim 1, wherein the arbitration logic includes a dynamic priority encoding scheme to optimize latency for changing workloads.

9. A method for allowing multiple TLBs to access a common hardware page walker, comprising:
    generating a bus access request;
    determining a priority among one of the multiple TLBs and the hardware page walker;
    asserting a bus grant based on the priority determination; and
    transferring data over a data bus.

10. The method of claim 9, wherein the priority determination is performed in a first arbiter associated with the hardware page walker.

11. The method of claim 10, wherein the multiple TLBs comprise a first TLB and a second TLB, and wherein the second TLB comprises a second arbiter, the second arbiter also performing the priority determination.

12. The method of claim 11, wherein the data transferring step comprises one of transferring data from the hardware page walker to one or more of the first and the second TLBs and transferring data from one of the first and the second TLBs to the hardware page walker.

13. The method of claim 11, wherein the first TLB is an instruction TLB and the second TLB is a data TLB.

14. The method of claim 9, wherein the hardware page walker drives data to one or more of the multiple TLBs in one clock cycle and receives data from one or more of the multiple TLBs in two clock cycles.

15. The method of claim 9, wherein the first arbiter signals a bus select unit which of one or more data busses is used to transfer data during each particular cycle.

16. The method of claim 9, wherein the first arbiter comprises an arbitration logic including a fixed priority logic.

17. An apparatus that controls access by a plurality of translation lookaside buffers (TLBs) to a common hardware page walker, comprising:
    a first arbiter associated with the page walker, the first arbiter comprising arbitration logic, wherein the first arbiter receives bus access requests from the plurality of TLBs and grants bus access based on the arbitration logic;
    a bus select unit coupled to the page walker and the plurality of TLBs that receives data from one or more of the plurality of TLBs; and
    bus drivers coupled to the first arbiter and the plurality of TLBs, wherein the bus drivers operate to drive data onto buses coupled to the plurality of TLBs.

18. The apparatus of claim 17, wherein one of the plurality of TLBs comprises a second arbiter that issues a bus access grant.

19. The apparatus of claim 17, wherein one or more of the TLBs is coupled to the page walker by a plurality of buses, and wherein a first bus of the plurality of busses may operate at a first bit rate and a second bus of the plurality of buses may operate at a second bit rate.

20. The apparatus of claim 17, wherein the driven data determines which of the plurality of TLBs acts on a page walker command.

* * * * *

UNITED STATES PATENT AND TRADEMARK OFFICE
CERTIFICATE OF CORRECTION

PATENT NO. : 6,560,664 B1
DATED : May 16, 2003
INVENTOR(S) : Richard Carlson

It is certified that error appears in the above-identified patent and that said Letters Patent is hereby corrected as shown below:

Title page,
Item [54], Title, delete "METHOD AND APPARATUS FOR TRANSLATION LOOKASIDE BUFFERS TO ACCESS A COMMON HARDWARE PAGE WALKER" and insert therefor -- METHOD AND APPARATUS FOR MULTIPLE TRANSLATION LOOKASIDE BUFFERS TO ACCESS A COMMON HARDWARE PAGE WALKER --

Signed and Sealed this

Thirty-first Day of May, 2005

JON W. DUDAS
*Director of the United States Patent and Trademark Office*